United States Patent
Pill et al.

(10) Patent No.: US 11,162,401 B2
(45) Date of Patent: Nov. 2, 2021

(54) EXHAUST GAS FLOWHOOD WITH TREATMENT FLUID INJECTOR AND VARIABLE MOUNTING ANGLE

(71) Applicant: Perkins Engines Company Limited, Peterborough (GB)

(72) Inventors: Richard Pill, Cardiff (GB); Srikanth Tummala, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/955,519

(22) PCT Filed: Jan. 8, 2019

(86) PCT No.: PCT/EP2019/025005
§ 371 (c)(1),
(2) Date: Jun. 18, 2020

(87) PCT Pub. No.: WO2019/137826
PCT Pub. Date: Jul. 18, 2019

(65) Prior Publication Data
US 2021/0010403 A1 Jan. 14, 2021

(30) Foreign Application Priority Data
Jan. 12, 2018 (GB) ..................... 1800524

(51) Int. Cl.
*F01N 3/20* (2006.01)
*F01N 3/28* (2006.01)

(52) U.S. Cl.
CPC ........... *F01N 3/206* (2013.01); *F01N 3/2892* (2013.01); *F01N 3/2066* (2013.01); *F01N 2610/11* (2013.01); *F01N 2610/1453* (2013.01)

(58) Field of Classification Search
CPC . B01D 53/90; B01D 53/9409; F01N 13/0097; F01N 13/18; F01N 13/1888;
(Continued)

(56) References Cited

U.S. PATENT DOCUMENTS

| 8,820,059 B1 | 9/2014 | Fahrenkrug et al. |
| 9,453,447 B2 | 9/2016 | Way et al. |

(Continued)

FOREIGN PATENT DOCUMENTS

| DE | 102008042678 A1 | 5/2009 |
| GB | 2549507 A | 10/2017 |

(Continued)

OTHER PUBLICATIONS

International Search Report for related International Application No. PCT/EP2019/025005; reported on Feb. 19, 2019.
(Continued)

*Primary Examiner* — Hai H Huynh
*Assistant Examiner* — Diem T Tran

(57) ABSTRACT

A flowhood assembly 1 comprises an injector 30 which is fixable to a mount 50 in a number of alternative mounted positions defined by rotation of the injector about an injection axis X2 relative to the mount. The injector 30 includes one or more coolant ports 34, 35 which are connected in use to a supply of liquid coolant C. The mount 50 is fixable to a flowhood 10 in an upright, design orientation and in alternative connected positions defined by rotation of the flowhood 10 relative to the mount 50 about a connection axis X1. In a normal use position of the assembly the connection axis X1 of the flowhood is arranged at a predefined angle, optionally 0°, relative to a nominal horizontal plane P1. The
(Continued)

injector 30 is not fixable to the mount 50 other than in the alternative mounted positions. In use in the normal use position, and in each of the alternative mounted positions of the injector, the injection axis X2 of the injector is oriented downwardly away from the injector relative to the horizontal plane P1, and at least one of the coolant ports 34, 35 is arranged above the horizontal plane P1 which passes through the injection axis X2 at an outlet end 32 of the nozzle.

10 Claims, 9 Drawing Sheets

(58) Field of Classification Search
CPC ............. F01N 2610/02; F01N 2610/11; F01N 2610/14; F01N 2610/1453; F01N 3/206; F01N 3/2066; F01N 3/208; F01N 3/2892; Y02T 10/12
See application file for complete search history.

(56) References Cited

U.S. PATENT DOCUMENTS

| | | | |
|---|---|---|---|
| 9,638,079 | B2 | 5/2017 | Keen et al. |
| 10,400,650 | B2 * | 9/2019 | Gharpure ................. F01N 3/24 |
| 2013/0219871 | A1 | 8/2013 | Crandell et al. |
| 2014/0331655 | A1 | 11/2014 | Crandell et al. |
| 2015/0176463 | A1 | 6/2015 | Olivier et al. |
| 2015/0192046 | A1 | 7/2015 | Gharpure |
| 2015/0285200 | A1 | 10/2015 | Niaz et al. |
| 2016/0245142 | A1 | 8/2016 | Venkataraghavan et al. |
| 2016/0367940 | A1 | 12/2016 | Lorenz et al. |

FOREIGN PATENT DOCUMENTS

| | | |
|---|---|---|
| WO | WO 2014/167352 A1 | 10/2014 |
| WO | WO 2014/167353 A1 | 10/2014 |

OTHER PUBLICATIONS

Great Britain Search Report for related GB Application No. GB 1800524.9; reported on Jun. 4, 2018.

* cited by examiner

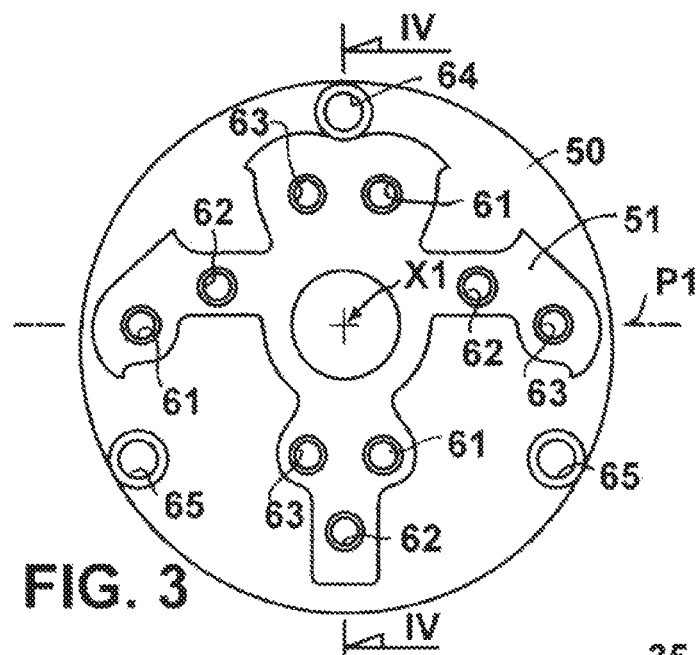
FIG. 3
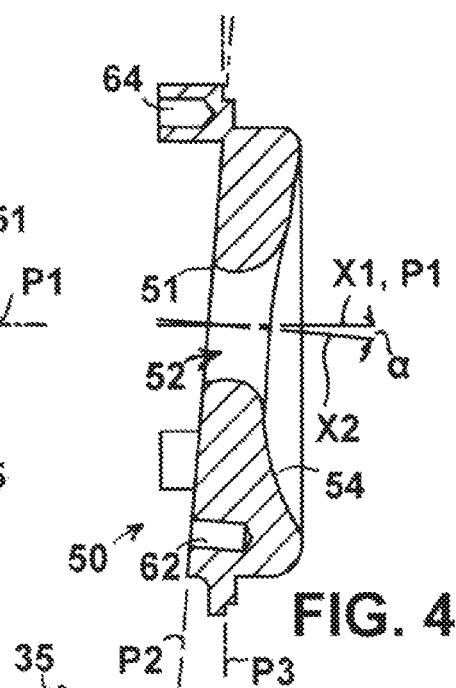
FIG. 4
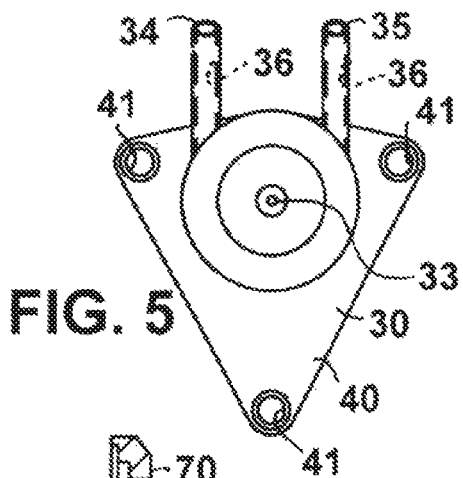
FIG. 5
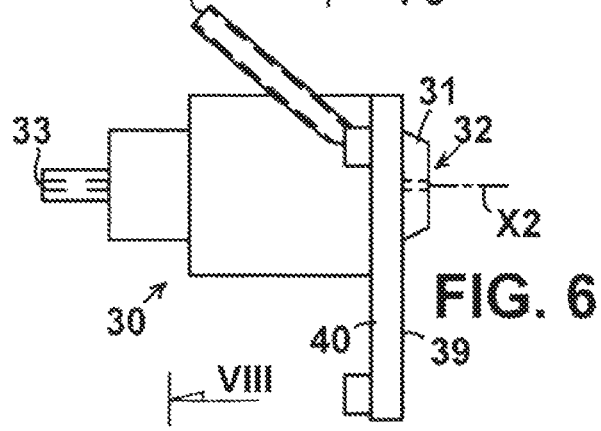
FIG. 6
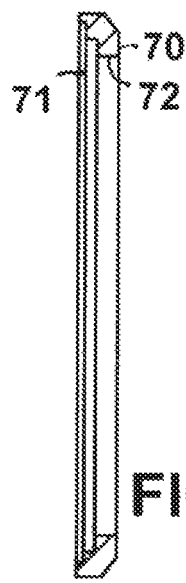
FIG. 8
FIG. 7

EXHAUST GAS FLOWHOOD WITH TREATMENT FLUID INJECTOR AND VARIABLE MOUNTING ANGLE

CROSS-REFERENCE TO RELATED APPLICATION

This Application is a 35 USC § 371 US National Stage filing of International Application No, PCT/EP2019/025005 filed on Jan. 8, 2019 which claims priority under the Paris Convention to Great Britain Patent Application No. 1800524.9 filed on Jan. 12, 2018.

TECHNICAL FIELD

This disclosure relates to a flowhood for an exhaust gas treatment system, particularly for use on an internal combustion engine, the flowhood having an injector for injecting a treatment fluid into the exhaust flowpath.

BACKGROUND

In this specification, a flowhood is any duct or casing which defines an exhaust flowpath through which exhaust gas may flow, and a treatment fluid is any fluid which is injected into an exhaust flowpath to treat the exhaust gas flowing through the flowpath.

Exhaust gas treatment systems are commonly used to reduce emissions in the exhaust stream of an internal combustion engine, often comprising a combination of aftertreatment devices arranged in series relation in the exhaust gas flowpath.

One such device is a diesel particulate filter, referred to herein as a DPF, used to remove particulate matter such as soot from the exhaust stream of a diesel internal combustion engine.

Another such device is a selective catalytic reduction device, referred to herein as an SCR, used to reduce NOx emissions in the exhaust stream. An SCR typically comprises a catalytic converter and an injector for injecting a treatment fluid comprising a reducing agent into the exhaust gas flow upstream of the catalytic converter. The treatment fluid reacts in the catalytic converter to reduce NOx emissions. In the case of a diesel engine, the reducing agent may be an aqueous urea solution made with urea and deionized water, known as diesel exhaust fluid (DEF).

An SCR is typically situated downstream from a DPF to avoid clogging of the catalytic converter by particulates in the exhaust stream.

In order to install such systems in a confined engine bay in close proximity to other engine components, it is common to configure a flowhood to reverse or otherwise change the direction of the exhaust flowpath between adjacent devices, so that the devices can be mounted close together in a compact assembly. In one example configuration, the flowhood may be arranged to receive the exhaust gas flowing from a DPF and redirect it to flow back through a downstream SCR arranged in parallel with the DPF. Conveniently, the injector of the SCR may be incorporated into the flowhood so that the treatment fluid can be injected into the flowpath immediately upstream of the SCR.

An exhaust gas treatment system may be mounted on any of a variety of different internal combustion engines or in the engine bay of a variety of different vehicles, and so it is desirable for its component parts to be reconfigurable to better fit the available space in their intended use position.

In use, the nozzle of the injector is heated by the exhaust gas. In order to keep the nozzle cool, a liquid coolant may be pumped through cooling passages in the injector. US2015192046A1 for example discloses an injector unit for an exhaust aftertreatment system which has two cooling ports arranged one vertically above the other.

Usually where a pumped coolant circuit is provided, the coolant pump will stop when the engine stops, at which point the exhaust gas flow will also stop. However, the injector typically has sufficient thermal mass to remain hot for a substantial length of time. If a treatment fluid such as DEF is allowed to remain on the hot nozzle, it can form solid deposits which block the nozzle.

In order to ensure that the treatment fluid flows away from the nozzle after the engine is stopped, it is known to mount the injector so that the nozzle points vertically downwards. This however reduces the available configuration options and makes it more difficult to fit the system into the confined space of an engine bay.

SUMMARY OF THE DISCLOSURE

In various aspects of the present disclosure there are provided a flowhood assembly and a method for mounting an injector on a flowhood, as defined in the claims.

The flowhood assembly includes a flowhood, an injector, and a mount for mounting the injector on the flowhood.

The flowhood includes an exhaust flowpath and a connection portion opening into the exhaust flowpath, the connection portion defining a connection axis.

The injector includes a nozzle, the nozzle having an outlet end and defining a first injection axis of the injector, a treatment fluid port connectable to a supply of treatment fluid to conduct the treatment fluid to the nozzle, and one or more coolant ports connectable to a supply of liquid coolant for cooling the injector in use. The injector is arranged in use to inject the treatment fluid from the outlet end of the nozzle along the first injection axis into the exhaust flowpath.

The flowhood has a normal use position defined by a predefined angle of the connection axis relative to a nominal horizontal plane.

The mount has a design orientation defined as an upright rotational position of the mount about the connection axis relative to the nominal horizontal plane. The mount is fixable to the connection portion of the flowhood in any of a plurality of alternative connected positions of the mount defined by rotation of the flowhood about the connection axis relative to the mount in the normal use position of the flowhood and the design orientation of the mount.

The injector is fixable to the mount in any of a plurality of alternative mounted positions of the injector, which are defined by rotation of the injector with respect to the mount about the injection axis through a range of second rotational positions angularly intermediate the alternative mounted positions. The injector is not fixable to the mount in said second rotational positions.

In each of the alternative mounted positions of the injector, when the mount is fixed to the connection portion in the design orientation of the mount and the normal use position of the flowhood and in any of the alternative connected positions of the mount, the injection axis is inclined downwardly away from the injector relative to the nominal horizontal plane; and at least one coolant port is arranged above a horizontal plane passing through the injection axis at the outlet end of the nozzle.

In a corresponding method of use, the mount is fixed to the flowhood in a selected one of the alternative connected positions of the mount, and then the injector is fixed to the mount in a selected one of the alternative mounted positions of the injector.

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

FIG. 3 is a front view of the mount;

FIG. 4 is a section through the mount taken at IV-IV of FIG. 3;

FIGS. 5 and 6 are respectively a front and side view of the injector;

FIG. 7 is a front view of the collar;

FIG. 8 is a section through the collar taken at VIII-VIII of FIG. 7;

Reference numerals appearing in more than one of the figures indicate the same or corresponding parts in each of them.

Referring to FIG. 1, a flowhood assembly 1 is configured for treatment of an exhaust gas G with a treatment fluid T. The assembly includes a flowhood 10, an injector 30, and a mount 50 for mounting the injector on the flowhood.

Figure 2:
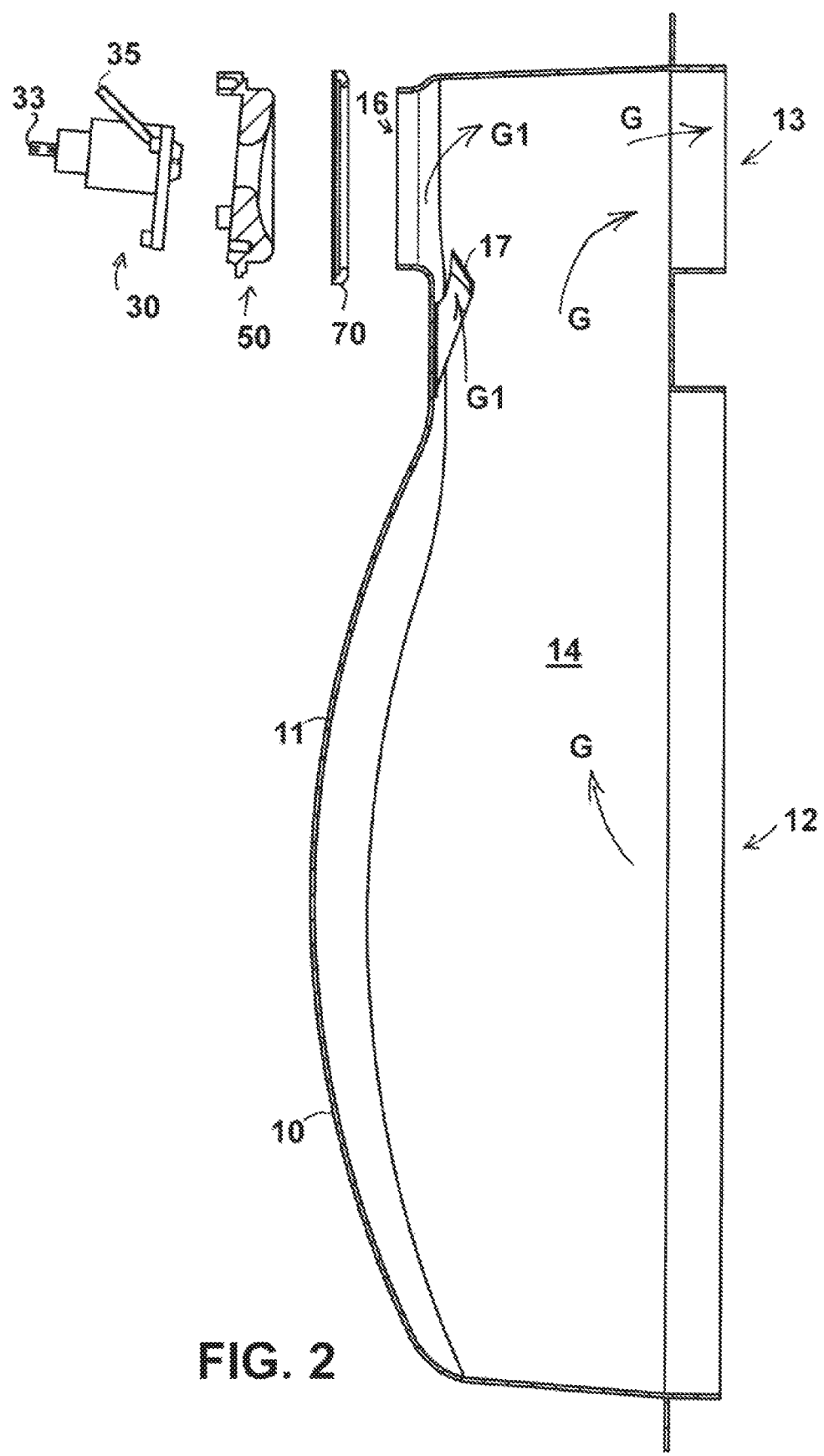
FIG. 2 is a section through the flowhood taken at II-II in position (a) of FIG. 11, with the DPF and SCR removed and showing the remaining components in exploded view.

Referring also to FIG. 2, the flowhood 10 may comprise a casing 11 which may be pressed, e.g. from metal sheet. In the illustrated example the casing 11 defines a circular aperture 16, a large diameter inlet 12 and a smaller diameter outlet 13 to which are connected respectively a DPF 2 and a catalytic converter 3 which together with the injector 30 forms an SCR. The flowhood defines an exhaust flowpath 14 via which hot exhaust gas G entering via the inlet 4 of the DPF is directed to flow from the DPF past the injector 30 into the catalytic converter 3 and then out via its outlet 5. The exhaust gas G may be generated by an internal combustion engine and may flow to the inlet 4, for example, via a diesel oxidation catalyst device or other, upstream components of the exhaust gas aftertreatment system of which the flowhood assembly 1 forms a part.

Figure 9:
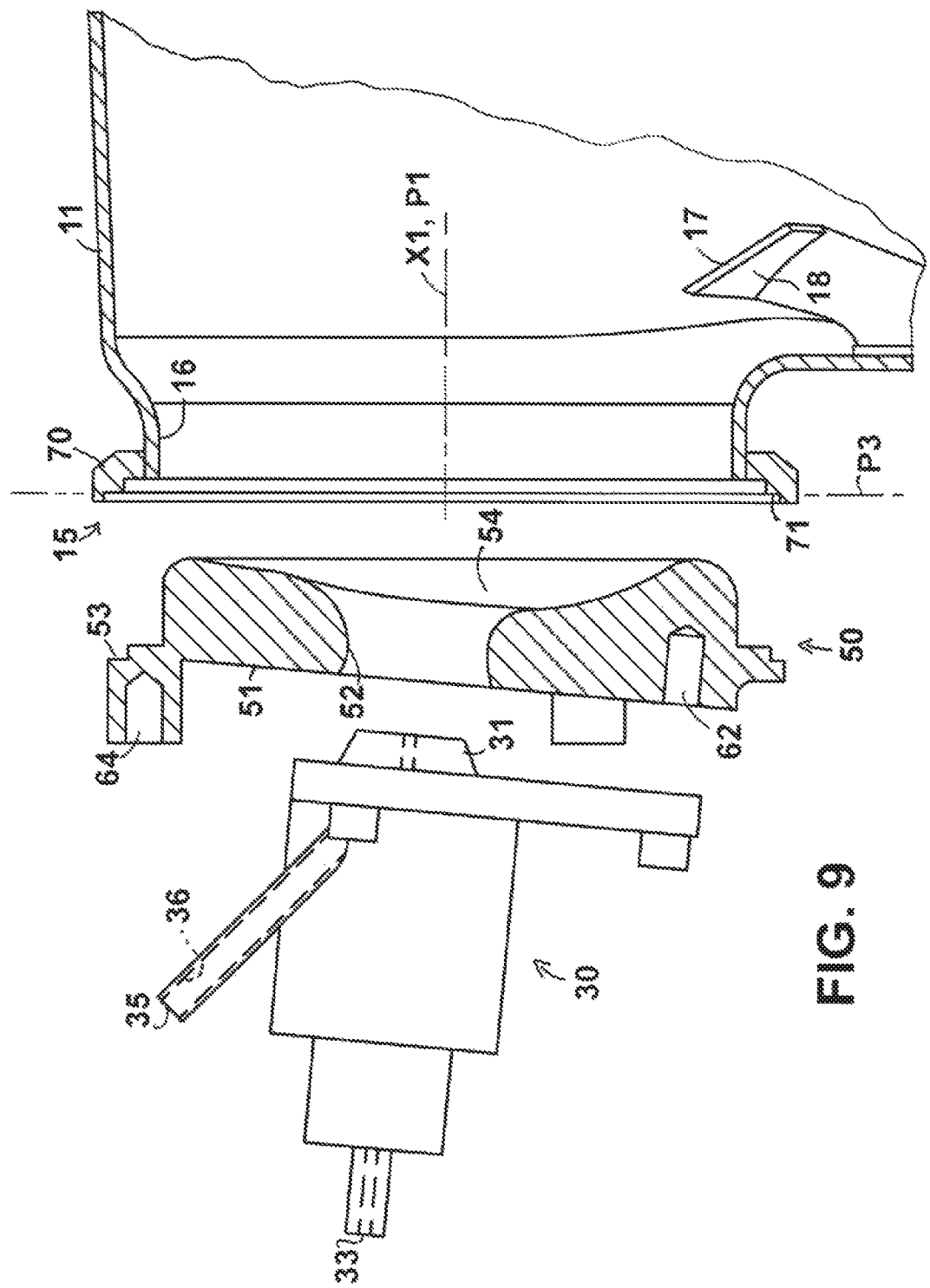
FIG. 9 is an enlarged view of part of the section of FIG. 2, showing the collar welded to the flowhood.

Referring also to FIGS. 7, 8 and 9, the flowhood may include a collar 70. The collar may be annular as shown and made by machining, e.g. from metal, and is configured to be welded all round its circumference to the circular aperture 16 in the casing 11 of the flowhood 10 so as to define a connection portion 15 of the flowhood, as best seen in FIG. 9. It can be seen that the collar defines an annular recess 71 whose surface lies in a connection plane P3, which lies in the plane of the drawing of FIG. 3 and may be vertical in the normal use position of the flowhood as shown. The connection portion 15 opens into the exhaust flowpath 14 and defines a connection axis X1, which extends axially centrally within the central aperture 72 of the collar, normal to the connection plane P3 and axially centrally through the connection portion 15 of the flowhood.

Figure 1:
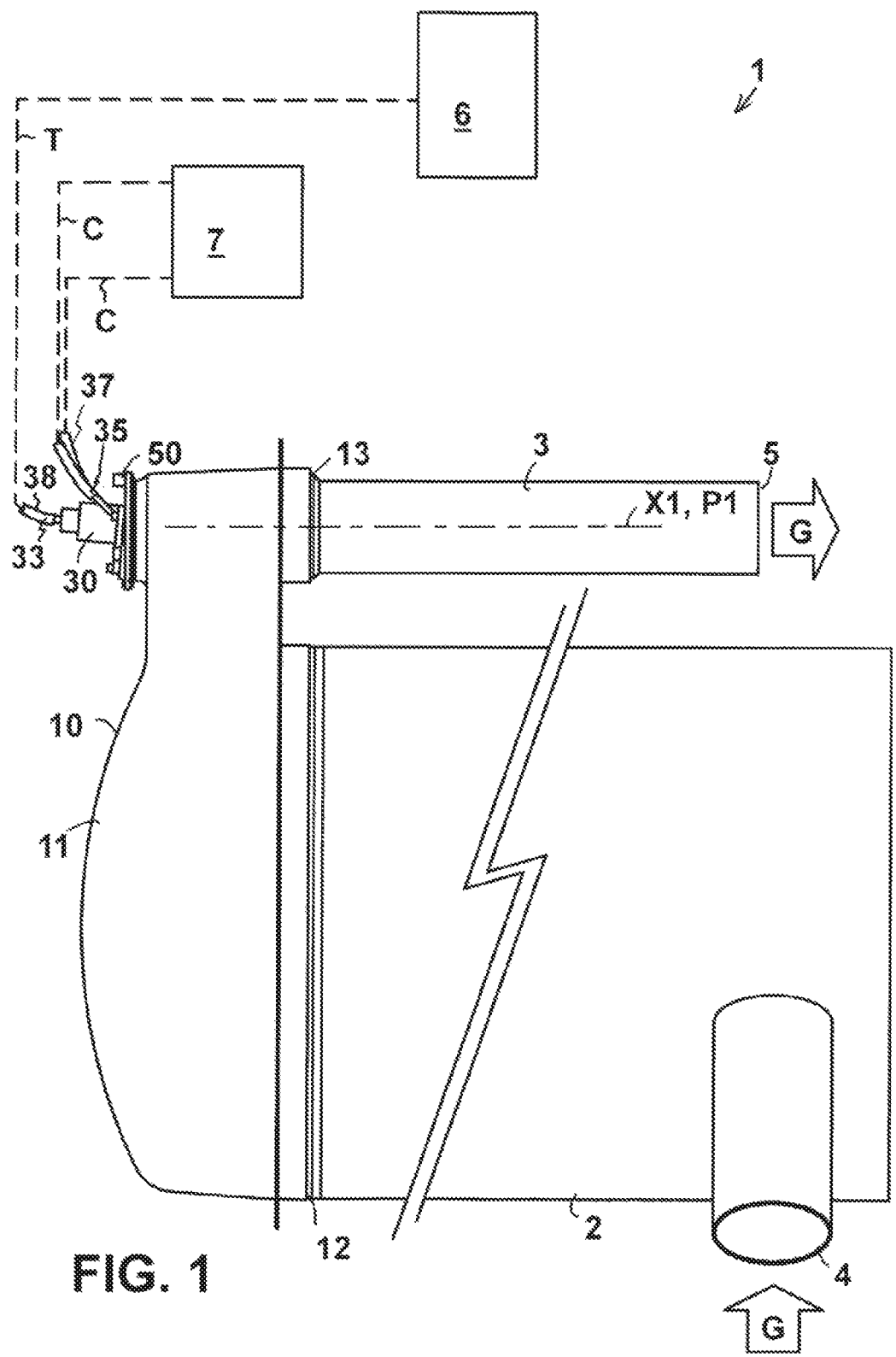
FIG. 1 is a side view of a flowhood assembly comprising a flowhood, a collar, an injector and a mount together with a DPF and SCR in a normal use position of the flowhood, wherein the mount is fixed to the collar forming the connection portion of the flowhood in its design orientation and in connected position (a) as shown in FIG. 11, and the injector is fixed to the mount in the mounted position shown in FIG. 11 and FIG. 13.

The flowhood assembly is shown in FIG. 1 and FIG. 9 in its normal use position, which is defined herein as a predefined angle of the connection axis X1 relative to a nominal horizontal plane P1.

In use, the assembly components are supported by connecting the DPF or other major components, for example, via straps (not shown) to mounting points on an internal combustion engine, so that the predefined angle of the connection axis X1 corresponding to the normal use position of the flowhood is determined by the intended fixed position of the assembly in the vehicle or other exhaust gas generating system in which it is to be used. In the illustrated example, the connection axis X1 is horizontal in the normal use position of the flowhood, i.e. the predefined angle is 0°, so that the connection axis X1 lies in the nominal horizontal plane P1. In alternative embodiments, the connection axis X1 could be inclined somewhat to the horizontal in the normal use position, but a horizontal or near horizontal orientation (within about 15° of horizontal) is usual.

Referring to FIGS. 3 and 4, the mount 50 may comprise a metal casting having a machined, major front surface 51. The mount may be annular with a central opening 52, wherein the connection axis X1 may pass approximately centrally through the opening as illustrated in FIGS. 3 and 4 which for ease of reference show the connection and injection axes X1, X2 positioned as they would be in the fully assembled condition of FIGS. 1 and 16, as further explained below.

An annular rear surface 53 may extend around the central opening 52 so that it engages the connection portion 15 of the flowhood and lies in the connection plane P3 when fixed to the connection portion of the flowhood as further explained below. The machined front surface 51 lies in a plane P2 which is inclined by an angle α relative to the connection plane P3 as defined by the rear surface 53.

Referring to FIGS. 5 and 6, the injector 30 is shown in simplified form and is of conventional design, including a nozzle 31 having an outlet end 32 and defining an injection axis X2 and a treatment fluid port 33 which is connectable, e.g. via a hose 38 to a supply 6 of treatment fluid T as shown in FIG. 1 to conduct the treatment fluid T to the nozzle 31 as known in the art. In use, the treatment fluid T is injected from the outlet end 32 of the nozzle along the injection axis X2 (defining a mean trajectory of the treatment fluid T leaving the nozzle) into the exhaust flowpath 14. It will be understood that the injector may include other functional components and additional fluid or electrical connections as known in the art, which are not illustrated.

The injector 30 also has a fixing means by which it can be fixed to the mount 50; in the illustrated example, the fixing means comprises three mounting holes 41 which are formed in the base 40 of the injector to receive fixings 60, e.g. machine screws. Of course, different fixing means could be used instead of the mounting holes 41.

The injector also includes one or more coolant ports, comprising in the illustrated example two coolant ports 34, 35, each of which is connectable, e.g. via hoses 37 to a supply 7 of liquid coolant C (FIG. 1). In use, the coolant C flows by gravity or by means of a pump (not shown) via the ports into internal coolant flowpaths 36 to cool the injector, particularly its nozzle 31 in use. In the illustrated example, the two coolant ports form the respective sides of a circuit through which the coolant C flows from the supply 7 via the injector and back to the supply.

Figure 12:
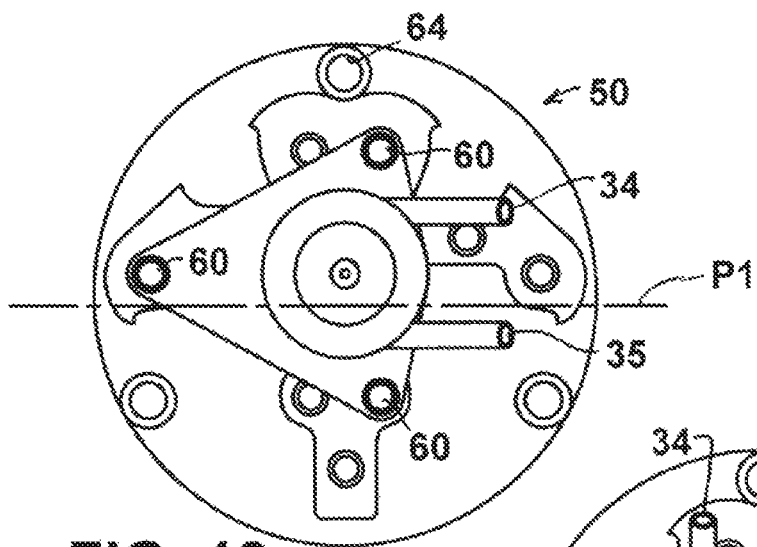
FIGS. 12, 13 and 14 show three alternative mounted positions of the injector defined by rotation of the injector with respect to the mount about the injection axis, with the mount in its design orientation.
Figure 13:
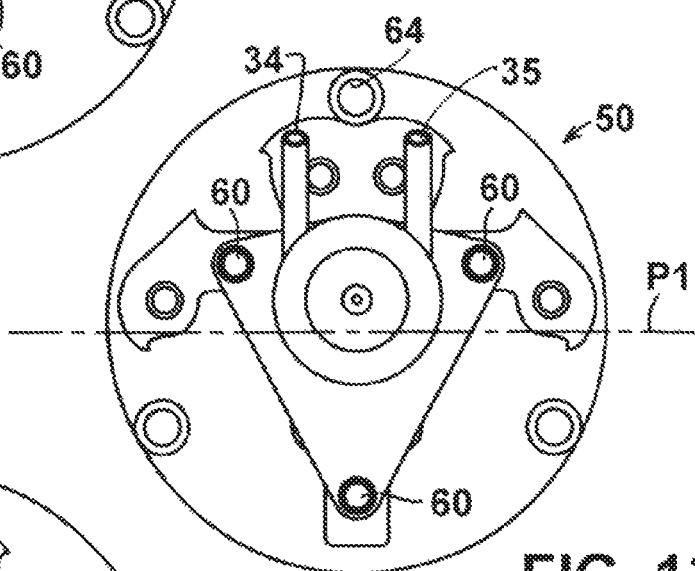
Figure 14:
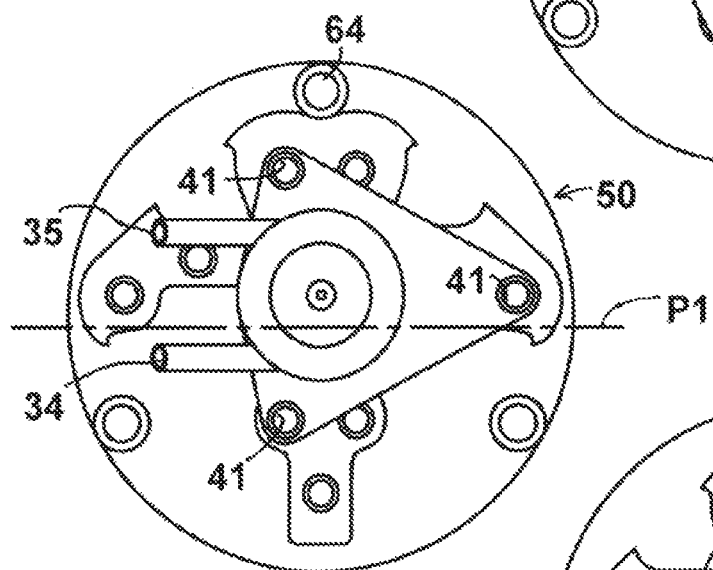
Figure 15:
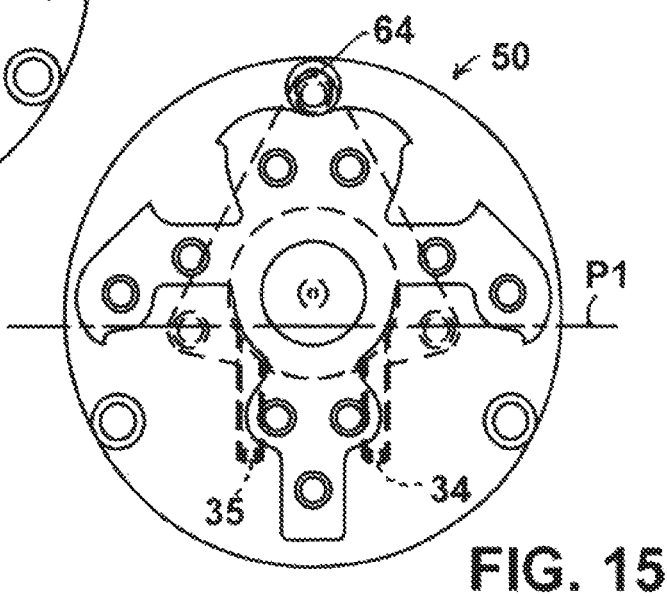
FIG. 15 shows a second rotational position of the injector angularly intermediate its alternative mounted positions, again with the mount in its design orientation.
Figure 16:
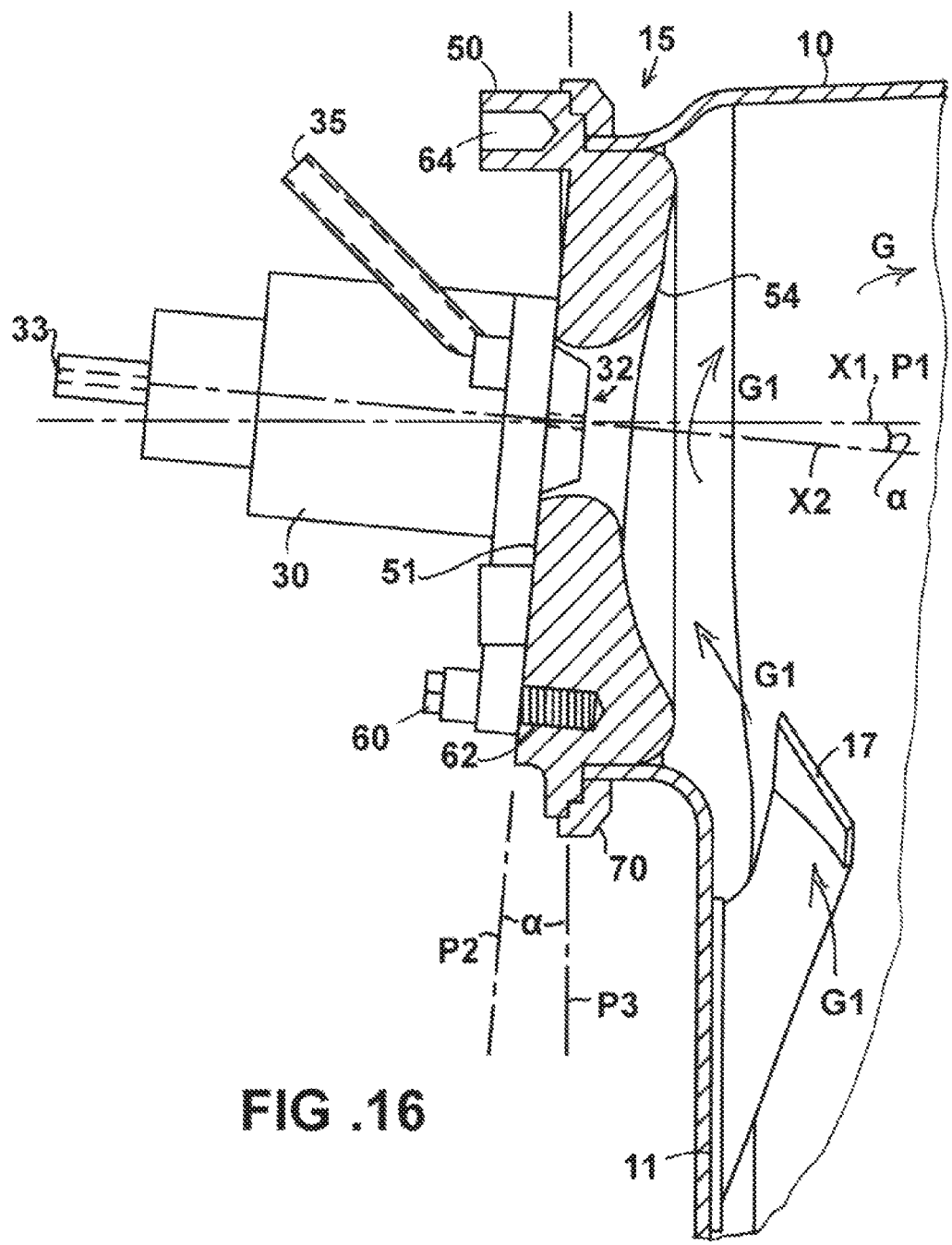
FIG. 16 is the view of FIG. 10, showing the injector fixed to the mount in the mounted position of FIG. 13.

The nozzle 31 extends from the rear surface 39 of the injector, which in each of the alternative mounted positions of the injector as shown in FIGS. 12, 13 and 14 lies on the machined front surface 51 and hence in the plane P2 of the mount so that the nozzle 31 extends through the central opening 52 of the mount, as best seen in FIG. 16. In the example shown, the injection axis X2 is normal to the flat, rear surface 39 of the injector and so normal to the plane P2 of the mount in each mounted position of the injector.

The mount 50 has a design orientation which is defined as an upright rotational position of the mount about the connection axis X1 relative to the nominal horizontal plane P1. The mount is shown generally in the figures in its design orientation, as best seen in FIGS. 3 and 4.

Figure 11:
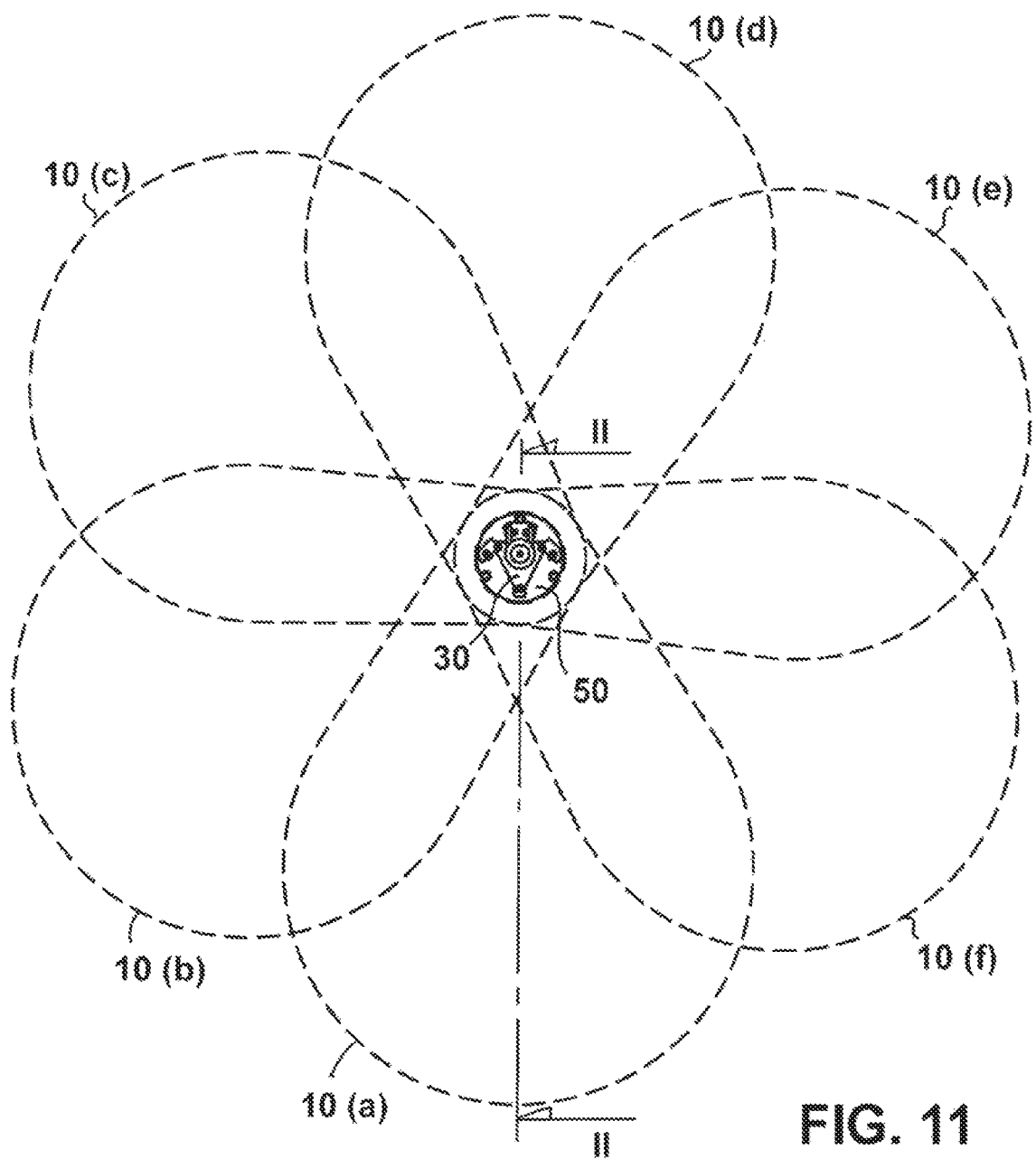
FIG. 11 is a front view of the flowhood assembly of FIG. 1, showing the mount in its design orientation and the injector in its mounted position as shown in FIGS. 1 and 13, and showing six alternative connected positions of the mount defined by rotation of the flowhood about the connection axis relative to the mount through positions (a)-(f)

Referring to FIG. 11, the mount 50 is fixable to the connection portion 15 of the flowhood in any of a plurality of alternative connected positions of the mount defined by rotation of the flowhood 10 about the connection axis X1 relative to the mount 50 in the normal use position of the flowhood (as shown in FIG. 1) and the design orientation of the mount (as shown in FIG. 11, where the mount and injector are both fixed and oriented as shown in the enlarged view of FIG. 13).

Figure 10:
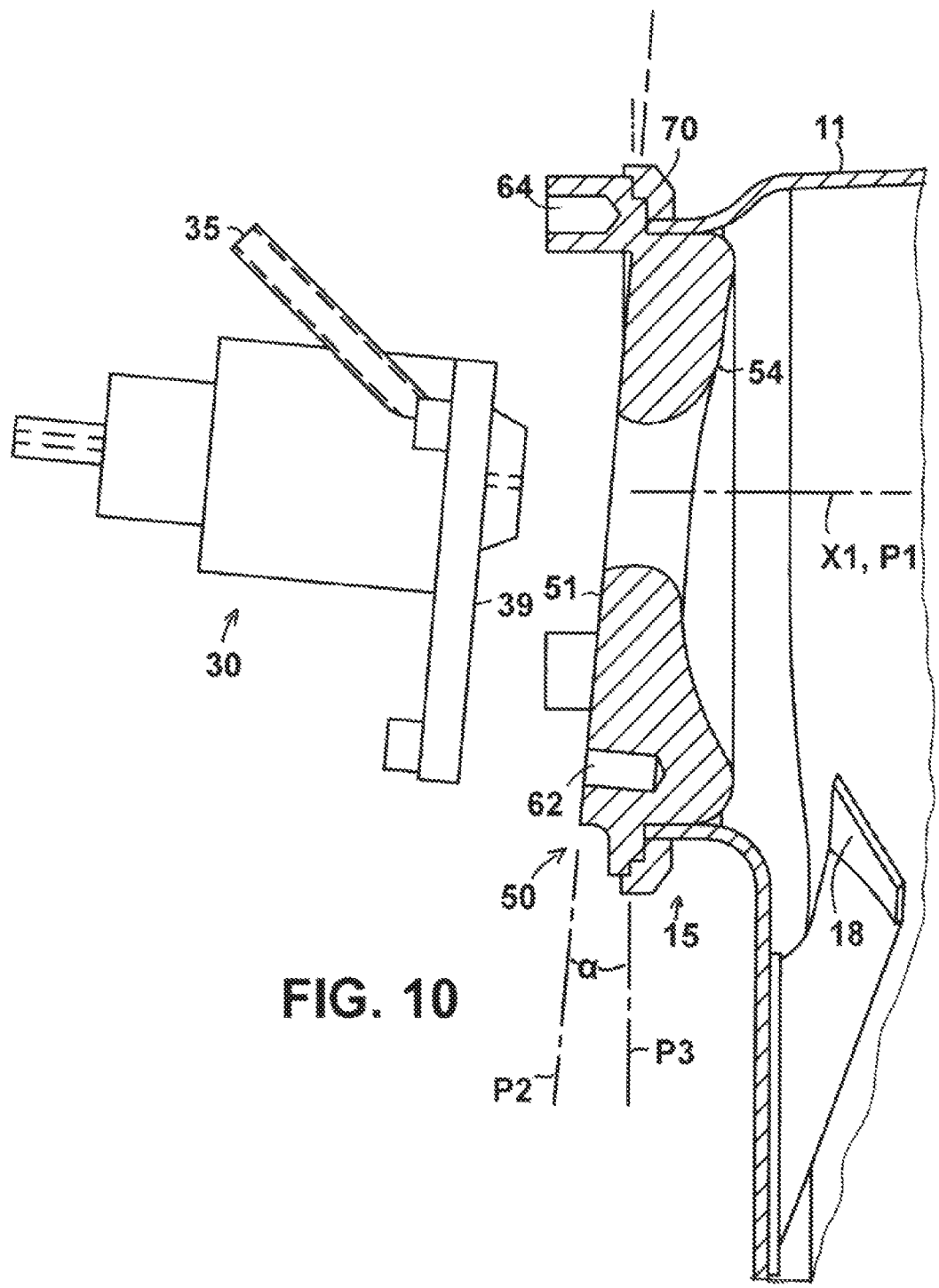
FIG. 10 is the view of FIG. 9, showing the mount fixed to the connection portion in its design orientation and in connected position (a) as shown in FIG. 11.

The alternative positions of the flowhood 10, defining the alternative connected positions of the mount 50 in its design orientation as shown, are illustrated in FIG. 11 as positions 10(*a*)-10(*f*), with position 10(*a*) corresponding to that of FIGS. 1 and 2 as shown in enlarged view in FIGS. 9, 10 and 16.

Figure 17:
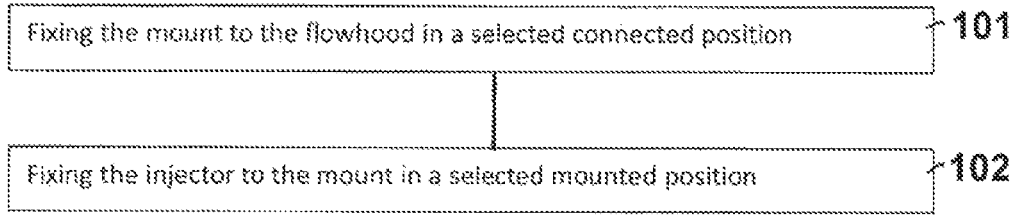
FIG. 17 shows the sequential assembly steps of the flowhood, mount, and injector.

Referring to FIG. 17, in use, the required connected position of the mount is selected to suit the intended installed configuration of the assembly. In step 101 the mount 50 is fixed to the flowhood 10 in the selected connected position, which may be any rotational position of the flowhood about the connection axis X1, e.g. position (a), (b), (c), (d), (e) or (f) as shown in FIG. 11. Conveniently, the mount 50 may be weldable to the collar 70, conveniently by welding all round its circumference, which is facilitated by making the mount 50 as a substantial body of cast metal.

After fixing the mount to the flowhood, and either before or after arranging the assembly in its normal use position, in step 102 the injector 30 is fixed to the mount 50 in a selected one of the alternative mounted positions of the injector. The injector and mount may define a discrete number of alternative mounted positions, which in the illustrated example consist of exactly three alternative mounted positions as shown respectively in FIGS. 12, 13 and 14.

Referring particularly to FIG. 3, it can be seen in the illustrated example that the mount 50 includes a first group of three threaded sockets 61, a second group of three threaded sockets 62, and a third group of three threaded sockets 63.

In addition, the mount includes an upper socket 64 which lies at the top of the mount in its design orientation, and a pair of lower sockets 65 which are horizontally aligned in the lower portion of the mount in its design orientation. The upper and lower sockets 64, 65 may be used for mounting additional components or for assembly and machining purposes, not further described.

Referring to FIGS. 12, 13 and 14, the injector 30 is fixable to the mount 50 in any of a plurality of alternative mounted positions of the injector, which are defined by rotation of the injector 30 with respect to the mount 50 about the injection axis X2 through a range of second rotational positions angularly intermediate said alternative mounted positions. In the example shown, the injector is rotated anticlockwise through 180 about the injection axis X2 to orient it progressively from the position of FIG. 12 through that of FIG. 13 to that of FIG. 14.

When the injector 30 is correctly oriented it may be fixed to the mount by placing its rear surface 39 in contact with the machined front surface 51 of the mount and inserting a fixing 60 through each of the mounting holes 41, which are aligned respectively:—in the mounted position of FIG. 12, with sockets 61; in the mounted position of FIG. 13, with sockets 62; and in the mounted position of FIG. 14, with sockets 63.

Conveniently, by forming the mount 50 as a substantial body of metal, e.g. by casting, sufficient material is provided to allow for all of the threaded sockets to be machined in one operation, providing three alternative mounted positions of the injector. Of course, a different number of discrete mounted positions might be provided by machining a different number of sockets, to allow for more (or fewer) configuration options when the coolant and treatment fluid hoses are connected in the use position of the assembly.

When fixed to the mount 50 in any of its alternative mounted positions as shown in FIGS. 12, 13 and 14, the rear surface of the injector is seated on the machined front surface 51 so that the inclined plane P2 determines the position of the injection axis X2 relative to the connection axis X1.

Referring to FIG. 16, it can be seen that in each of the alternative mounted positions of the injector as shown in FIGS. 12, 13 and 14, when the mount 50 is fixed to the connection portion 15 in the design orientation of the mount 50 and the normal use position of the flowhood 10, and in any of the alternative connected positions of the mount, the injection axis X2 is inclined downwardly away from the injector 30 by the angle α relative to the nominal horizontal plane P1, and at least one coolant port 34 or 35 is arranged above a horizontal plane P1 passing through the injection axis X2 at the outlet end 32 of the nozzle.

In the mounted position of FIG. 12, the coolant port 34 is arranged above the plane P1, while in the mounted position of FIG. 14, the coolant port 35 is arranged above the plane P1. In the mounted position of FIG. 13, both coolant ports 34 and 35 are arranged above the plane P1.

Although only connected position (a) is illustrated in side view, it will be understood that the mount 50 remains in its design orientation and the connection axis X1 remains in the same, predefined angular position in each of the alternative connected positions of the mount defined by the alternative rotational positions (b)-(f) of the flowhood, so that the downward angular inclination α of the injection axis X2 and the arrangement of at least one coolant port above the plane P1 remain the same in each alternative rotational position of the flowhood.

In the illustrated example, the injection axis X2 is normal to the rear surface 39 of the injector and hence to the plane P2 of the machined front surface 51 of the mount in each mounted position of the injector. Thus, the angle α between the plane P2 and the vertical connection plane P3 is equal to the angle α between the injection axis X2 and the nominal horizontal plane P1. In the fully assembled condition the injection axis X2 lies in a vertical plane containing the connection axis X1.

In order to allow the nozzle to drain freely while being compatible with a generally horizontal normal use position of the assembly, and at the same time to ensure that the treatment fluid T enters the exhaust gas flowpath generally in the flow direction of the exhaust gas G towards the catalytic converter, it is found that the angle α may lie in the range from 4° to 6°. In the illustrated example, the angle α is 5°.

Referring to FIGS. 12-15, as the injector is rotated through a full revolution about the injection axis X2 it passes through a range of second rotational positions angularly intermediate the three discrete alternative mounted positions of FIGS. 12, 13 and 14. The injector 30 is illustrated in broken lines in one such second rotational position in FIG. 15, in which, in use, both coolant ports 34, 35 would be arranged below the horizontal plane P1 in the connected position and design orientation of the mount. In the second rotational position of FIG. 15 it can be seen that the mounting holes 41 do not align with any of the threaded sockets 61, 62, 63, which is also true in the other second rotational positions. Thus, the injector is not fixable by the fixing means to the mount in any of the second rotational positions.

Figure 18:
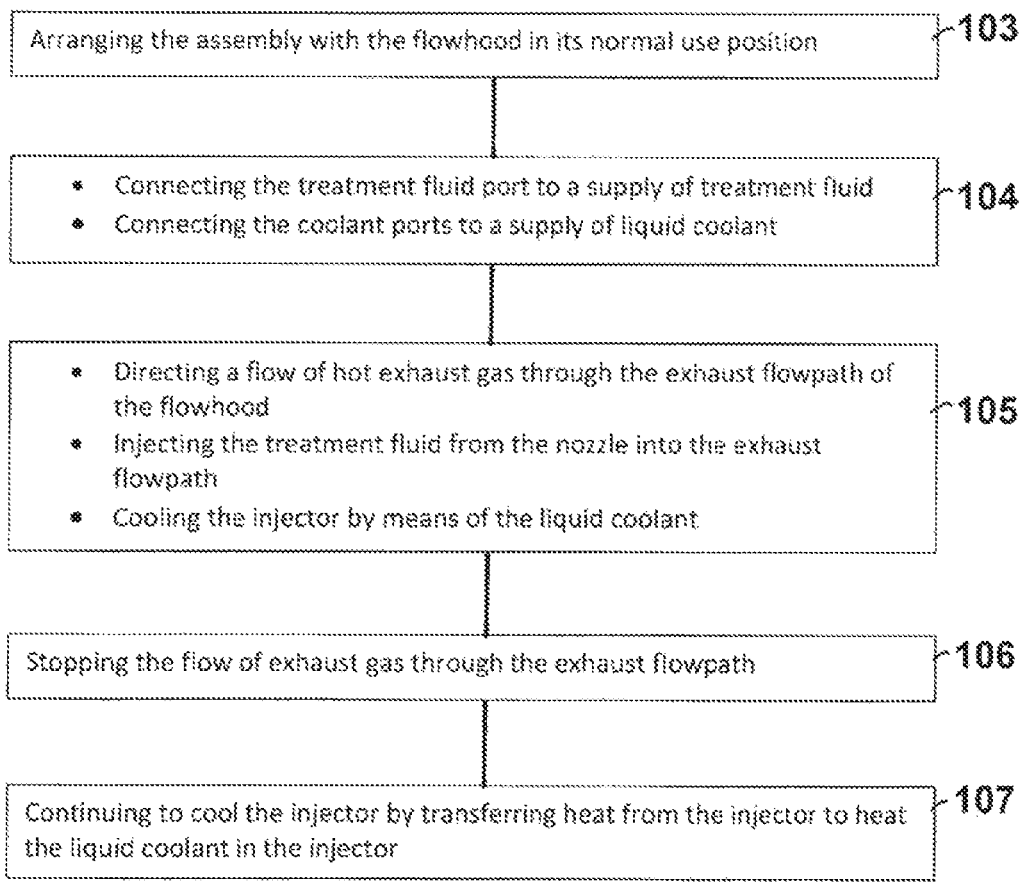
FIG. 18 shows additional steps in use of the assembly.

Referring to FIG. 18, in use, and after fixing the mount in the selected connected position, and either before or after fixing the injector in the selected mounted position, the assembly is arranged with the flowhood 10 in its normal use position (step 103).

In step 104 the treatment fluid port 33 is fluidly connected to a supply 6 of treatment fluid T, and each of the coolant ports 34, 35 is fluidly connected to a supply 7 of liquid coolant C. The treatment fluid T may be a reducing agent such as DEF or any other suitable agent such as aqueous ammonia as known in the art.

Then, at step 105 a flow of hot exhaust gas G is directed through the exhaust flowpath 14 of the flowhood 10. The treatment fluid T is injected from the outlet end 32 of the nozzle 31 into the exhaust flowpath while cooling the injector by means of the liquid coolant C which flows through the coolant flowpaths 36 inside the injector 30 via the coolant ports 34, 35.

Then, at step 106 the flow of exhaust gas G through the exhaust flowpath 14 is stopped.

After stopping the flow of exhaust gas, at step 107 the liquid coolant continues to cool the injector by absorbing heat transferred from the injector to heat the liquid coolant in the injector. The heated liquid coolant flows upwardly away from the injector via the respective one of the coolant ports 34 and/or 35 which is arranged above the horizontal plane P1 passing through the injection axis X2 at the outlet end 32 of the nozzle, allowing fresh liquid coolant C to flow towards the injector 30 via a respective one of the coolant ports 34, 35 to replace the heated liquid coolant. If the coolant ports and cooling passages are narrow and a pair of coolant ports are provided as shown, then the cold coolant C may flow down through one port as the heated coolant flows convectively up through the other.

Optionally, depending on the selected liquid coolant and the target maximum temperature of the nozzle required to prevent clogging by the treatment fluid, the nozzle may be cooled at step 107 by phase change of the coolant.

Thus, the liquid coolant may be allowed to boil in the coolant flowpaths 36 inside the injector, so that the boiling liquid coolant C flows away from the injector 30 as a gas via the respective coolant port arranged above the horizontal plane P1, while fresh liquid coolant C flows back towards the injector 30 via a respective one of the coolant ports to replace the boiling liquid coolant.

Referring again to FIG. 2, the flowhood 10 may include a deflector 17 arranged in the exhaust flowpath to deflect a portion G1 of the exhaust gas G to impinge on the nozzle 31 in use in each of the alternative connected positions of the mount and each of the alternative mounted positions of the injector. The deflector 17 may be arranged to configured to provide that the velocity of the deflected portion G1 of the exhaust gas G impinging on the nozzle 31 of the injector is in the range of 3-10 m/s in use.

The deflector 17 may define a surface 18 which may be flat or curved and having a mean angular orientation defined by a tangent at a centre of the surface which extends away from the inlet 12 and towards the nozzle 31 at an angle in the range of 20°-70°, more preferably 30°-50°, most preferably 35°-45° relative to the connection axis X1.

Additionally as shown, a surface 54 of the mount proximate the nozzle 31 may be contoured to direct the portion G1 of the exhaust gas to flow across the nozzle 31 in use in each of the alternative connected positions of the mount and each of the alternative mounted positions of the injector. As shown, the contoured surface 54 may be annular to surround the central opening 52.

The directed flow G1 helps to remove the treatment fluid 31 from the nozzle and so further helps to prevent clogging of the nozzle.

INDUSTRIAL APPLICATION

The novel assembly may be used, for example where a DPF and SCR are to be mounted on an internal combustion engine, to provide an adjustable configuration of the exhaust treatment system components whereby the flowhood may be rotated or "clocked" for installation in any desired position about the connection axis, and wherein the injector may be mounted in any one of the available alternative mounting positions, to suit the pipework configuration and space constraints of the engine bay. At the same time, the novel assembly ensures that the treatment fluid is able to drain from the nozzle of the injector by virtue of its downward inclination, while heated coolant can rise through at least one coolant port above the nozzle outlet so that the injector can be cooled by convective flow of the coolant in the coolant circuit, even after the coolant pump stops running, and irrespective of the selected angular configuration of the system components.

The injector is not fixable to the mount in any other position which would place the coolant ports below the median horizontal plane P1 of the nozzle outlet end in use. Thus, the mount and flowhood may be fixed together and supplied to the end user (e.g. vehicle engine builder) in a configuration wherein the injector may be installed and fixed in a range of alternative possible mounted positions to suit the use situation, while ensuring that none of those alternative positions will prevent convective cooling of the nozzle in use.

Optionally, heat may be removed from the injector by phase change of the coolant, whereby coolant boiling in the injector may escape via the upper coolant port to be replaced by fresh liquid coolant.

In summary, in a preferred embodiment a flowhood assembly 1 comprises an injector 30 which is fixable to a mount 50 in a number of alternative mounted positions defined by rotation of the injector about an injection axis X2 relative to the mount. The injector 30 includes one or more coolant ports 34, 35 which are connected in use to a supply of liquid coolant C. The mount 50 is fixable to a flowhood 10 in an upright, design orientation and in alternative connected positions defined by rotation of the flowhood 10 relative to the mount 50 about a connection axis X1. In a normal use position of the assembly the connection axis X1 of the flowhood is arranged at a predefined angle, optionally 0°, relative to a nominal horizontal plane P1. The injector 30 is not fixable to the mount 50 other than in the alternative mounted positions. In use in the normal use position, and in each of the alternative mounted positions of the injector, the injection axis X2 of the injector is oriented downwardly away from the injector relative to the horizontal plane P1, and at least one of the coolant ports 34, 35 is arranged above the horizontal plane P1 which passes through the injection axis X2 at an outlet end 32 of the nozzle.

Many possible adaptations within the scope of the claims will be evident to those skilled in the art.

In the claims, reference numerals and characters are provided in parentheses purely for ease of reference and should not be construed as limiting features.

The invention claimed is:

1. A flowhood assembly for treatment of an exhaust gas with a treatment fluid, the assembly including:
   a flowhood,
   an injector, and
   a mount for mounting the injector on the flowhood;
   the flowhood including;
   an exhaust flowpath, and
   a connection portion opening into the exhaust flowpath, the connection portion defining a connection axis;
   the injector including:
   a nozzle, the nozzle having an outlet end and defining an injection axis of the injector,
   a treatment fluid port connectable to a supply of treatment fluid to conduct the treatment fluid to the nozzle, and
   one or more coolant ports connectable to a supply of liquid coolant for cooling the injector in use;
   the injector being arranged in use to inject the treatment fluid from the outlet end of the nozzle along the injection axis into the exhaust flowpath;
   the flowhood having a normal use position defined by a predefined, angle of the connection axis relative to a nominal horizontal plane;
   the mount having a design orientation defined as an upright rotational position of the mount about the connection axis relative to the nominal horizontal plane;
   the mount being fixable to the connection portion of the flowhood in any of a plurality of alternative connected positions of the mount defined by rotation of the flowhood about the connection axis relative to the mount in the normal use position of the flowhood and the design orientation of the mount;
   the injector being fixable to the mount in any of a plurality of alternative mounted positions of the injector, said alternative mounted positions being defined by rotation of the injector with respect to the mount about the injection axis through a range of second rotational positions angularly intermediate said alternative mounted positions; wherein
   the injector is not fixable to the mount in said second rotational positions; and
   in each of said alternative mounted positions of the injector, when the mount is fixed to the connection portion in the design orientation of the mount and the normal use position of the flowhood and in, any of said alternative connected positions of the mount;
   the injection axis is inclined downwardly away from the injector relative to the nominal horizontal plane; and
   at least one said coolant port is arranged above a horizontal plane passing through the injection axis at the outlet end of the nozzle.

2. The flowhood assembly according to claim 1, wherein the connection axis is arranged in said nominal horizontal plane in the normal use position of the flowhood.

3. The flowhood assembly according to claim 1, wherein in each of said alternative mounted positions of the injector, when the mount is fixed to the connection portion in the design orientation of the mount and the normal use position of the flowhood and in any of said alternative connected positions, of the mount, the injection axis is inclined at an angle from 4° to 6° downwardly away from the injector relative to the nominal horizontal plane.

4. The flowhood assembly according to claim 1, wherein the flowhood includes a deflector arranged in the exhaust flowpath to deflect a portion of the exhaust gas to impinge on the nozzle in use in each of said alternative connected positions of the mount and each of said alternative mounted positions of the injector.

5. The flowhood assembly according to claim 4, wherein a surface of the mount proximate the nozzle is contoured to direct said portion of the exhaust gas to flow across the nozzle in use in each of said alternative connected positions of the mount and each of said alternative mounted positions of the injector.

6. The flowhood assembly according to claim 1, wherein the mount is annular with a central opening, and the nozzle extends through the central opening in each of said alternative mounted positions of the injector.

7. The flowhood assembly according to claim 1, wherein the flowhood comprises a pressed casing with a collar welded to the casing, the collar defining the connection portion, and the mount is weldable to the collar.

8. The flowhood assembly according to claim 1, wherein the assembly includes a diesel particulate filter and a catalytic converter, the flowhood being arranged to direct the exhaust gas to flow from the diesel particulate filter into the catalytic converter.

9. The method for mounting an injector on a flowhood, comprising:
   providing a flowhood assembly according to claim 1;
   fixing the mount to the flowhood in a selected one of the alternative connected positions of the mount; and then
   fixing the injector to the mount in a selected one of the alternative mounted positions of the injector.

10. The method according to claim 9, further comprising:
    arranging the assembly with the flowhood in its normal use position;
    connecting the treatment fluid port to a supply of treatment fluid;

connecting the or each of the one or more coolant ports to a supply of liquid coolant; and then directing a flow of hot exhaust gas through the exhaust flowpath of the flowhood, injecting the treatment fluid from the outlet end of the nozzle into the exhaust flowpath, and cooling the injector by means of the liquid coolant; and then stopping the flow of exhaust gas through the exhaust flowpath; and then continuing to cool the injector by transferring heat from the injector to heat the liquid coolant in the injector; wherein the heated liquid coolant flows away from the injector via a respective one of said one or more coolant ports arranged above a horizontal plane passing through the injection axis at the outlet end of the nozzle; and wherein fresh liquid coolant flows towards the injector via a respective one of said one or more coolant ports to replace said heated liquid coolant.

* * * * *